United States Patent [19]

Wang

[11] Patent Number: 5,179,849
[45] Date of Patent: Jan. 19, 1993

[54] STEERING WHEEL LOCK FOR AUTOMOBILE

[75] Inventor: Mao-Hsiung Wang, Tainan Hsien, Taiwan

[73] Assignee: Cheeng Iu Industrial Co., Ltd., Chia-yi, Taiwan

[21] Appl. No.: 703,733

[22] Filed: May 21, 1991

[51] Int. Cl.⁵ .............................................. B60R 25/02
[52] U.S. Cl. ........................................ 70/209; 70/226
[58] Field of Search .......... 70/198, 201, 209, 211-214, 70/225, 226, 237, 238

[56] References Cited

U.S. PATENT DOCUMENTS

| | | | |
|---|---|---|---|
| 4,399,893 | 8/1983 | Switzer | 70/226 X |
| 4,730,470 | 3/1988 | Zane et al. | 70/211 X |
| 4,738,127 | 4/1988 | Johnson | 70/209 |
| 4,887,443 | 12/1989 | Wang | 70/209 |
| 4,935,047 | 6/1990 | Wu | 70/209 |
| 4,970,884 | 11/1990 | Solow | 70/226 X |
| 5,014,529 | 5/1991 | Wu | 70/209 |
| 5,022,246 | 6/1991 | Wang | 70/226 X |
| 5,040,388 | 8/1991 | Chen | 70/209 |

FOREIGN PATENT DOCUMENTS

| | | | |
|---|---|---|---|
| 2639591 | 6/1990 | France | 70/226 |
| 593652 | 10/1947 | United Kingdom | 70/226 |

*Primary Examiner*—Renee S. Luebke
*Assistant Examiner*—Suzanne L. Dino
*Attorney, Agent, or Firm*—Morton J. Rosenberg; David I. Klein

[57] ABSTRACT

A steering wheel lock for capturing a steering wheel and a foot control pedal of automobiles. The steering wheel lock provides for a sliding rod displaceable within an inner tubular member which is positioned within an outer tubular member. The sliding rod has a lock cylinder at one end with its pin extending out of an opening and a protuberance at the outer edge of the same end. The inner tubular member has a plurality of aligned openings or small holes which block the sliding rod from moving when the pin extends through one of the holes. A pair of longitudinally directed troughs allows the protuberance to move in the trough freely as the sliding rod is longitudinally displaced. A circular ring is fixedly secured to the outer tubular member and spaced from the end of the inner tubular member to define a circular recess, and an arcuate trough extends between the pair of longitudinal troughs at the opposing end of the inner tubular member to permit rotation of the sliding rod. The top of the pin includes an inclined surface facing in one direction so that when the sliding rod is pulled in such direction, the inclined surface of the pin allows sliding of the pin through the successively aligned holes until the sliding rod has reached a desired position where the pin extends out through one of the holes.

4 Claims, 5 Drawing Sheets

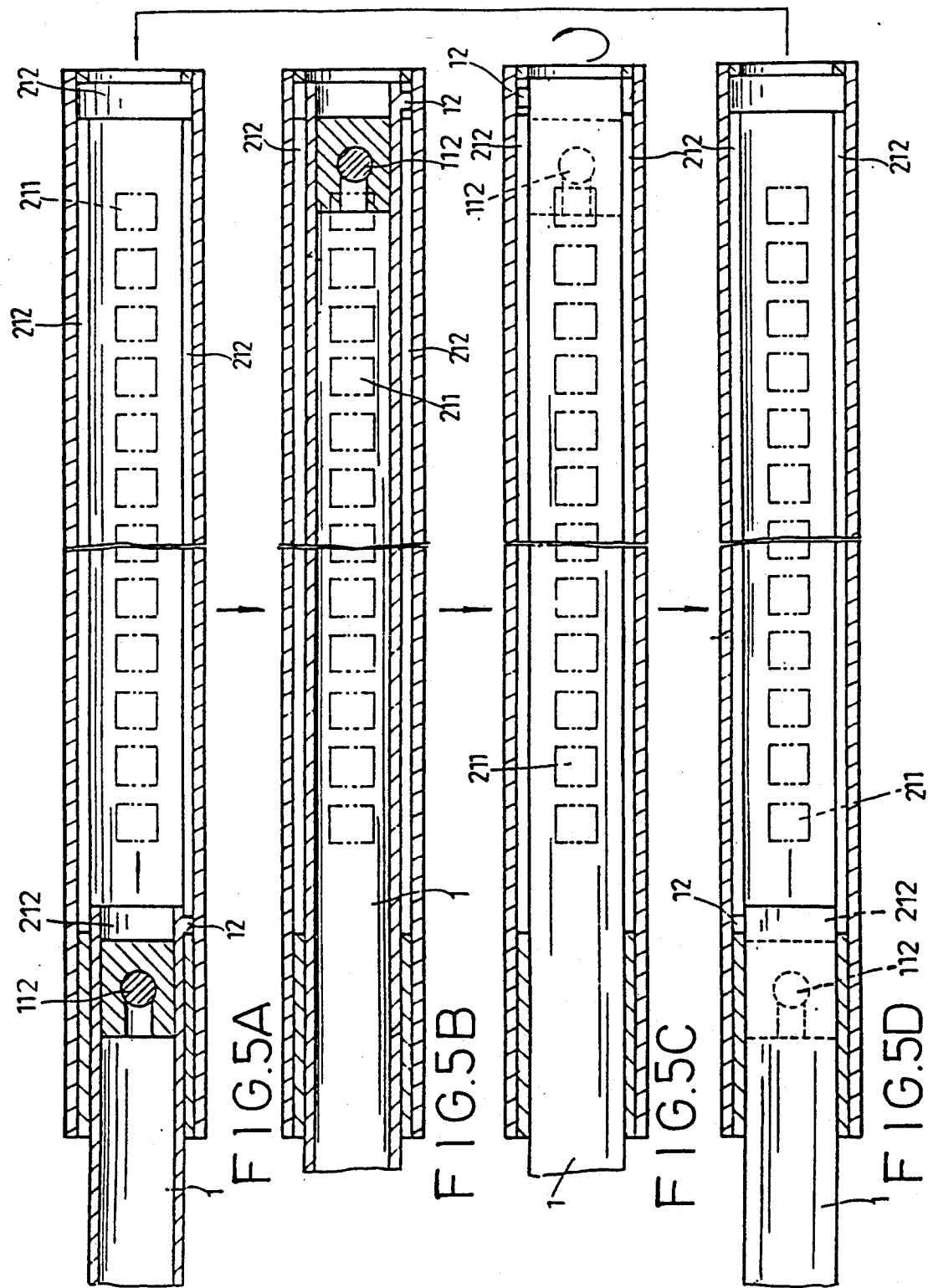

STEERING WHEEL LOCK FOR AUTOMOBILE

BACKGROUND OF THE INVENTION

The automobile has played an important role in the daily life of users throughout the world and is a valuable asset. However, such vehicles have been the target of thieves and also subject to unauthorized users. A number of locks have been invented to prevent illegal or unauthorized operation of such vehicles. There are two popular anti-thief locks marketed at the present time. In one system, such confines the movement of a steering wheel, while in the other type system, such limits the operation of both the steering wheel and a foot control pedal. One of the prior art systems uses a lock to capture a spoke or a rim of a steering wheel and further extends a solid bar to a predetermined distance where it is either blocked by the driver or the windshield when the steering wheel is turned. Another type of system has one hook formed at one end to engage a foot control pedal and a hook at the other end to engage the steering wheel that limits both the wheel and the foot control pedal movement. Both of the above-mentioned lock systems are used to prevent unauthorized operation of the vehicle or theft thereof. However, in both types of locking systems, there is required a legal key to provide unlocking and sometimes the operator must bend down to find the keyhole to insert the key which is an inconvenience of use.

The inventor, in view of this, has invented an improved steering wheel lock which needs no key to lock the steering wheel.

SUMMARY OF THE INVENTION

It is a primary object of the present invention to provide an improved steering wheel lock for an automobile which requires no key to operate the lock.

It is another object of the present invention to provide an improved steering wheel lock for automobiles wherein it is not necessary to bend down to find a keyhole.

It is still another object of the present invention to provide an improved steering wheel lock for automobiles which is simple to operate.

DETAILED DESCRIPTION OF THE PREFERRED EMBODIMENTS

Figure 1:
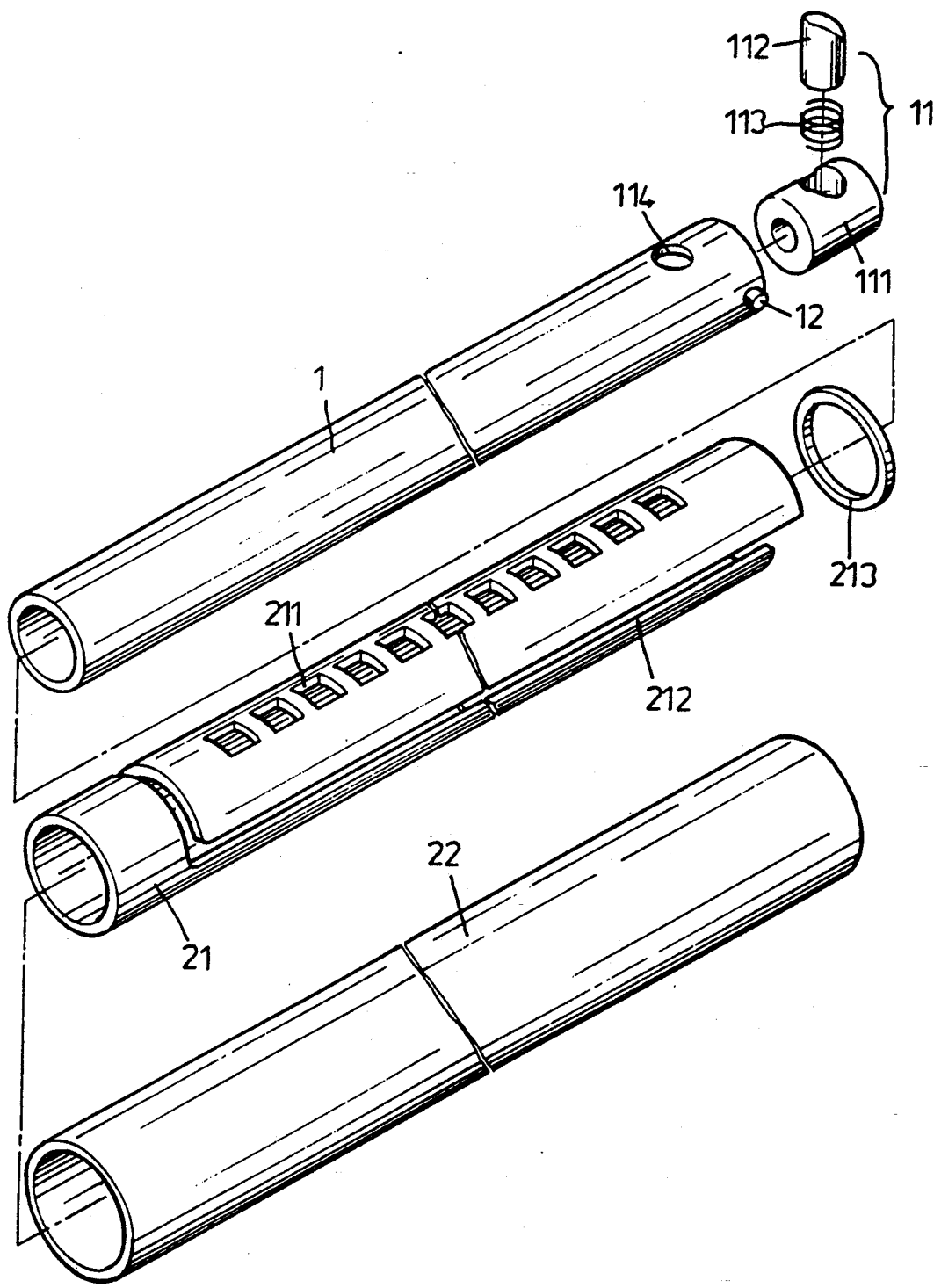
FIG. 1 is a fragmentary exploded view of the present invention.
Figure 2:
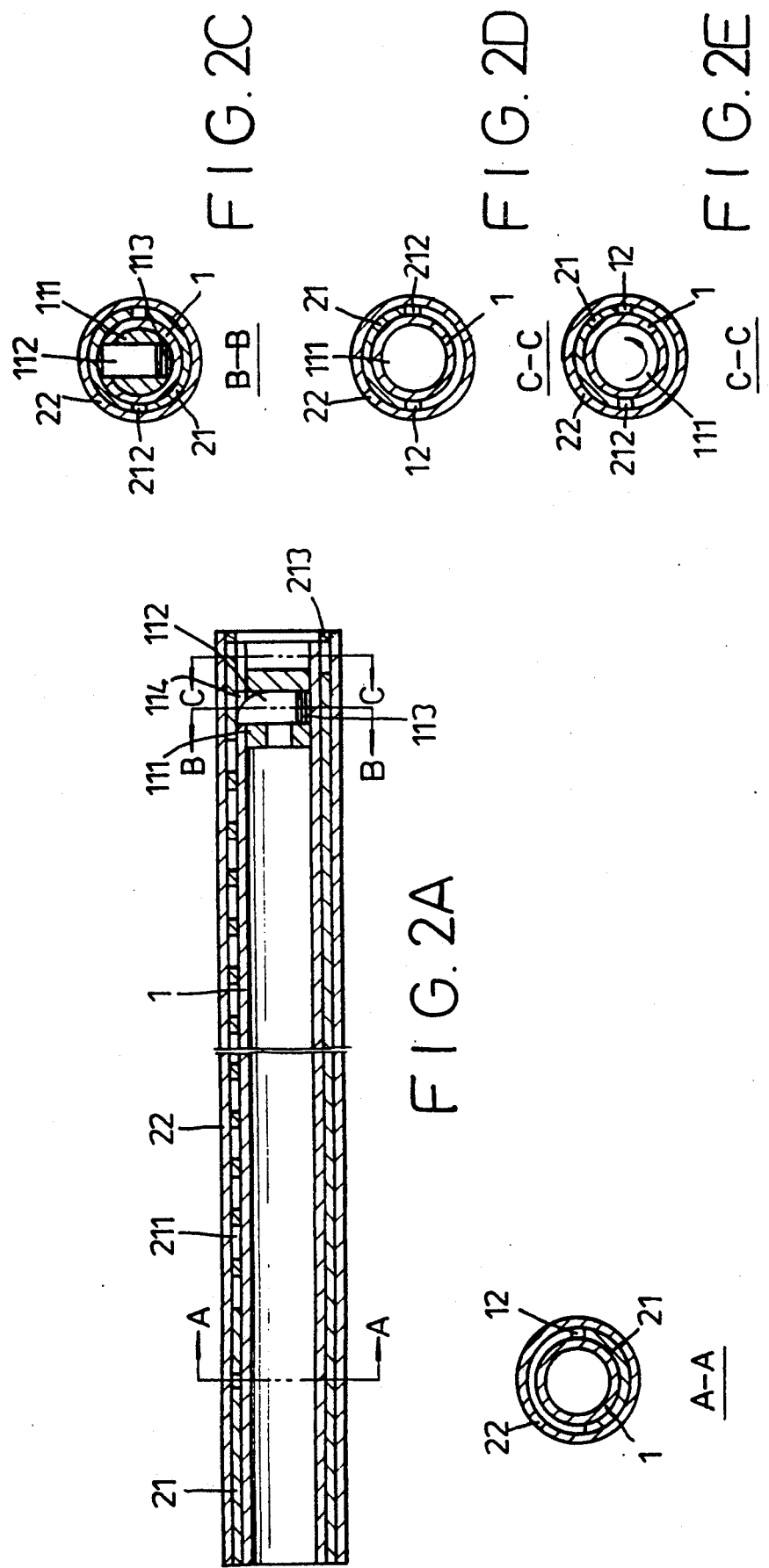
FIGS. 2A, 2B, 2C, 2D, and 2E are cross-sectional views of the present invention taken along respective Section Lines.

Reference is now made to FIGS. 1, 2A-2D, which show the present invention essentially consisting of a sliding rod 1, a latch tube 2 having an inner tubular member 21 and an outer tubular member 22 in combination with a lock cylinder 11. The sliding rod 1 has the lock cylinder 11 installed on one end and includes a protuberance 12 formed at the outer edge of the same end.

The lock cylinder 11 includes a pin 112 placed above a spring 113 with both being inserted into a depression 111 formed in the lock cylinder 11 and is mounted in the near end of the inner tubular member 21 which is fixedly placed in the outer tubular member 22. There are a plurality of longitudinally aligned openings or small holes 211 located on one side and a pair of longitudinally directed troughs 212 formed on opposing sides of the small holes 211 of the inner tubular member 21 extending and from one end to the other, as is clearly seen in FIG. 1. The troughs 212 are connected to each other by a trough passing around the periphery of the inner tubular member 21, as is shown in FIG. 1. The inner tubular member 21 includes a circular ring 213 located at the aforementioned end as a stop member to prevent the protuberance 12 of the sliding rod 1 from being removed from the troughs 212.

When pushing the sliding rod 1 inwardly on the latch tube 2, which is a combination of the inner tubular member 21 and the outer tubular member 22, the protuberance 12 moves freely in the troughs 212 that lead the pin 112.

Due to the fact that the top face of the pin 112 is inclined inwardly, such slide through each hole 211 until the sliding rod 1 has reached the desired length and the pin 112 extends into one of the holes 211. The spring 3 pushes or biases the pin 112 upwardly, forcing the pin 112 to extend out of the hole 211 where the steering wheel and the control pedal may then be securely locked. The sliding rod 1 cannot be moved from the hole 211 through which it extends unless the lock cylinder 11 is opened by a key.

Figure 3:
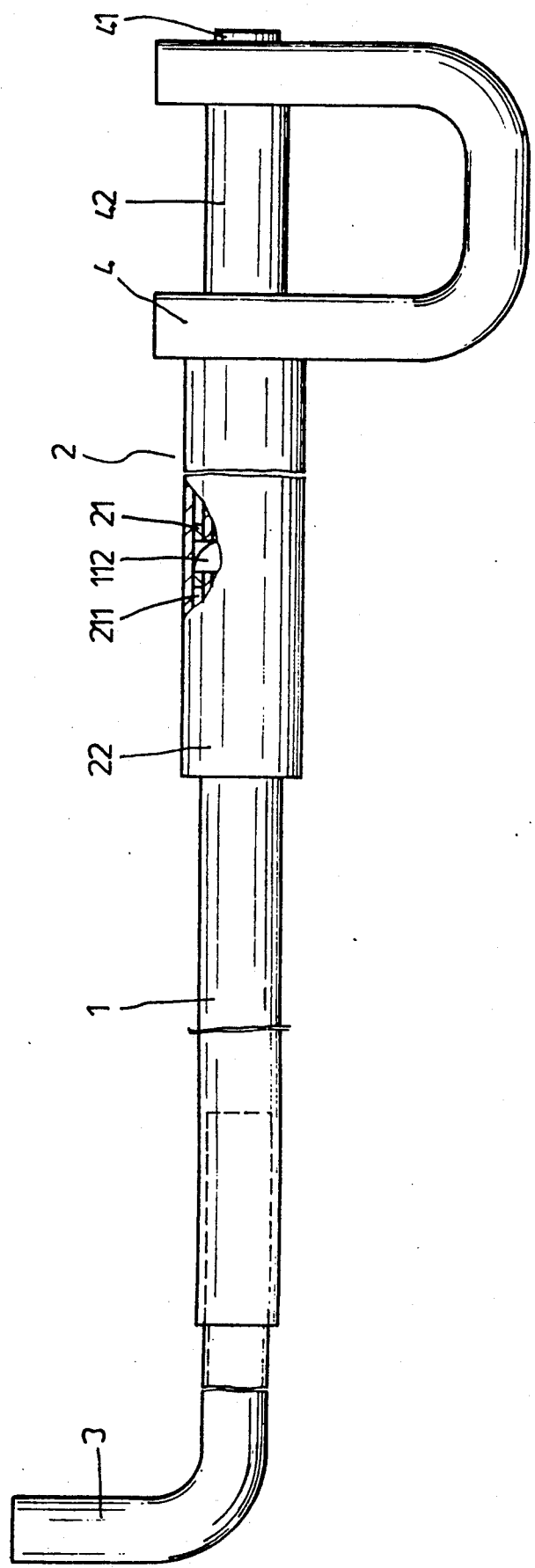
FIG. 3 is an elevational view, partially cut-away, of the present invention showing a U-shaped hook at one end and an L-shaped hook at the other end.

FIG. 3 shows an L-shaped hook 3 formed at one end and a U-shaped hook 4 formed at the other end. When it is desired to lock a steering wheel of an automobile, initially the user unlocks the lock cylinder 41 which releases the lock rod 42 from the latch tube 2 and the U-shaped hook 4 from the lock rod 42. Secondly, the user slides the rod 1 inwardly until the protuberance 12 has reached the end where the protuberance 12 may be turned to the other side of the trough 212 which is at an opposing side of the holes 211. This brings the pin 112 to face an inner wall of the inner tubular member 21 that draws the pin 112 back into the depression 111 and the sliding rod 1 is pulled outwardly to a position where the protuberance 12 has reached the other side of the trough 212 and the pin 112 is in alignment with the small holes 211.

The U-shaped hook 4 is mounted on a spoke or a rim of the steering wheel and the lock cylinder 41 is locked. The hook 3 is engaged to a foot pedal and the sliding rod 1 is moved inwardly until the sliding rod 1 can no longer be displaced. The pin 112 extends from the hole 211 and the lock is secured.

Figure 4:
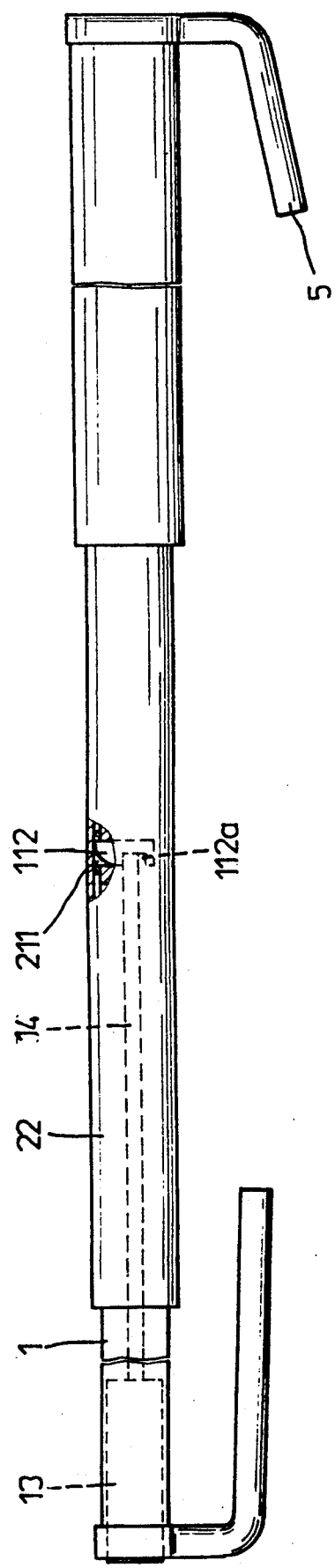
FIG. 4 is a side view partially cut-away of another embodiment of the subject invention, showing two hooks on opposing ends; and, FIGS. 5A-5D are side cross-sectional views of the instant invention concept.

FIG. 4 shows the lock core 13 mounted in the near end of the sliding rod 1 and has an extended linking rod 14 which is inserted within recess 112a of the pin 112. By inserting a legal key in the core and operational actuation of the key which brings the pin 112 downwardly to be removed from the hole, there is an unlocking condition. When locking a car, the lock is pulled to its extended position and the two hooks are engaged to a foot control pedal and a steering wheel. The sliding rod 1 is pushed inwardly to the length where the steering wheel and the foot control pedal are securely locked and the pin 112 has extended through an opening 211 that secures both the steering wheel and the foot control pedal movement.

FIGS. 5A–5D show the detailed relationship among the protuberance 12, the pin 112, and the holes 211. When the protuberance 12 is displaced to the end of the longitudinal trough 212, the pin 112 is no longer aligned with the small holes 211 and is drawn back to its depression 111 by the wall (shown in FIGS. 5A and 5B). However, when turning the protuberance 12 at either end, the longitudinal trough 212 and the pin 112 will also turn simultaneously and will face the inner wall and the sliding rod 1 moves freely as shown in FIGS. 5C and 5D.

I claim:

1. An improved steering wheel lock for an automobile comprising:
   (a) a longitudinally extending latch tube defined by an inner longitudinally directed tubular member concentrically located within an outer longitudinally directed tubular member, said inner tubular member having a plurality of longitudinally aligned openings passing through a sidewall thereof, said inner tubular member having (1) a pair of longitudinally extending troughs formed within said sidewall of said outer tubular member, said troughs being located on opposing sides of said aligned openings, (2) an arcuate trough disposed adjacent a first end of said inner tubular member and extending circumferentially between said pair of longitudinally extending troughs, and (3) a circular recess defined between an annular ring disposed within said outer tubular member and a second end of said inner tubular member;
   (b) a sliding rod member having a lock cylinder fixedly secured to one end of said sliding rod member, said sliding rod being insertable within said inner tubular member and having a protuberance extending from a sidewall thereof for sliding engagement within one of said troughs, said lock cylinder having a spring biased lock cylinder pin member for insert into one of said aligned openings for longitudinal adjustment of the length of said latch tube and said sliding rod member, said sliding rod member being rotatable within said outer tubular member when said protuberance is engaged within said circular recess for substantially preventing said lock cylinder pin from engaging any of said aligned openings, whereby said sliding rod member can subsequently be extended from said latch tube without operation of said lock cylinder.

2. The improved steering wheel lock as recited in claim 1 where said sliding rod member includes a hollow housing, said lock cylinder defining a lock housing secured to said hollow housing, said hollow housing having a pin opening formed through a sidewall for passage therethrough of said spring biased lock cylinder pin member for releasable insertion into one of said longitudinally aligned openings formed in said inner tubular member, said spring biased lock cylinder pin member having an inclined upper surface to allow displaceable extension of said sliding rod member with respect to said latch tube.

3. The improved steering wheel lock as recited in claim 2 including a U-shaped lock member releasably secured to said outer tubular member on one end thereof for coupling to a steering wheel of said automobile.

4. The improved steering wheel lock as recited in claim 2 where said sliding rod member is contoured in the form of an L-shaped hook on one end thereof for coupling to a foot pedal of said automobile.

* * * * *